United States Patent
Wong et al.

(10) Patent No.: US 8,203,969 B2
(45) Date of Patent: Jun. 19, 2012

(54) NETWORK TIMING TOPOLOGY VIA NETWORK MANAGER

(75) Inventors: Kin Yee Wong, Ottawa (CA); Peter Roberts, Stittsville (CA)

(73) Assignee: Alcatel Lucent, Paris (FR)

( * ) Notice: Subject to any disclaimer, the term of this patent is extended or adjusted under 35 U.S.C. 154(b) by 315 days.

(21) Appl. No.: 12/635,341

(22) Filed: Dec. 10, 2009

(65) Prior Publication Data

US 2011/0142078 A1 Jun. 16, 2011

(51) Int. Cl.
*H04L 12/28* (2006.01)

(52) U.S. Cl. ........ 370/255; 370/350; 370/503; 709/224; 709/248

(58) Field of Classification Search .......... 370/254, 370/255, 350, 503–520; 709/224, 248
See application file for complete search history.

(56) References Cited

U.S. PATENT DOCUMENTS

| | | | | |
|---|---|---|---|---|
| 5,696,701 A * | 12/1997 | Burgess et al. | ............ | 709/224 |
| 5,956,347 A * | 9/1999 | Slater | ............ | 370/503 |
| 6,058,103 A * | 5/2000 | Henderson et al. | ............ | 370/254 |
| 6,144,675 A * | 11/2000 | Wakabayashi et al. | ....... | 370/516 |
| 6,707,828 B1 * | 3/2004 | Wolf | ............ | 370/503 |
| 7,613,212 B1 * | 11/2009 | Raz et al. | ............ | 370/510 |
| 8,031,747 B2 * | 10/2011 | Barry et al. | ............ | 370/516 |
| 2008/0144515 A1 * | 6/2008 | Ouellette et al. | ............ | 370/503 |

* cited by examiner

*Primary Examiner* — Jeffrey M Rutkowski
(74) *Attorney, Agent, or Firm* — Kramer & Amado, P.C.

(57) ABSTRACT

The invention is directed to providing a method and system for monitoring and managing from a network management entity, timing-over-packet synchronization performance in a packet switching network having multiple network nodes. The network management entity determines a physical topology and a synchronization topology of the network and monitors synchronization performance by collecting virtual path information.

20 Claims, 2 Drawing Sheets

NETWORK TIMING TOPOLOGY VIA NETWORK MANAGER

CROSS REFERENCE TO RELATED APPLICATIONS

The present application is related to U.S. patent application Ser. No. 12/263,111, entitled "Common Timing Reference" (Wong et al.), and filed on Oct. 31, 2008, the entire content of which is incorporated by reference into the present application.

The present application is related to U.S. patent application Ser. No. 12/492,882, entitled "Centralized Node Clock Auto Reconfiguration" (Wong et al.), and filed on Jun. 26, 2009, the entire content of which is incorporated by reference into the present application.

The present application is related to United States patent application, entitled "Network Sync Simulation" (Wong et al.), and filed on even date herewith, the entire content of which is incorporated by reference into the present application.

FIELD OF THE INVENTION

The present invention is directed to packet switching communication networks, and particularly to monitoring timing-over-packet performance in a network.

BACKGROUND OF THE INVENTION

As telecommunications networks are increasingly moving from time division multiplexing (TDM) based protocols such as Synchronous Optical Networking (SONET) to packet switching technologies, maintaining network wide synchronization of nodes has become more challenging. This is especially important when integrating TDM networks with packet switching network elements having T1 and E1 interfaces. Unlike TDM connections, packet-switched networks are not designed for network-wide synchronization of nodes. Techniques have been developed to extract timing and synchronization information from the packet data stream, generally referred to as timing-over-packet. Thus, although timing-over-packet systems can exchange timing information using packets, the inherent characteristics of the packet-switched network affect the accuracy and reliability of the synchronization. For example, unlike circuit-switched networks, packet-switched networks use variable paths with a variable bit rate, such that timing packets may arrive at nodes at varying intervals or may not arrive at all, thereby affecting the synchronization of the nodes.

Synchronization protocols such as Synchronization Status Messaging (SSM) allow for maintaining the network synchronization using a hierarchical network clocking structure of a master or primary clock such as a Stratum 1 reference and slave or secondary clocks such as Stratum 2 or Stratum 3. SSM provides for selection of the best reference to be used at each network element. SSM provides a minimal level of timing loop avoidance to ensure two adjacent network elements do not time off each other, but it does not ensure avoidance of loops involving three or more network elements. Routers and other packet switching network elements are increasingly used to provide network synchronization using timing-over-packet or synchronous Ethernet techniques. Currently SSM is not yet universal for packet switching network elements; not all telecommunication packet switching network elements support SSM. Routers may not have sufficient network intelligence to initiate automatic clock reconfiguration based on network failures.

Currently, timing-over-packet synchronization performance can typically only be monitored at each node in a network. Therefore, a means for monitoring timing at a network level would be desirable.

SUMMARY OF THE INVENTION

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

One aspect of the invention is directed to providing a method of monitoring timing-over-packet synchronization performance in a packet switching network comprising a plurality of network nodes. The method comprises steps of defining at a network management entity, a physical topology of the packet switching network, collecting at a network management entity, a status of the physical topology; determining at the network management entity, a physical layer synchronization topology of the packet switching network; determining at the network management entity, a timing-over-packet synchronization topology of the packet switching network; retrieving at the network management entity, synchronization clock source information from the network nodes; verifying clock quality of synchronization clock sources identified in the receiving step; and monitoring at the NMS, synchronization clock performance of the synchronization clock sources.

In some embodiments of the invention the synchronization topology is determined by collecting virtual path information of timing-over-packet connections.

Some embodiments of the invention further comprise a step of modifying synchronization topology of the packet switching network, responsive to the monitoring step.

Some embodiments of the invention further comprise a step of setting predetermined performance thresholds.

Some embodiments of the invention further comprise steps of: monitoring network activity; and correlating the network activity with the synchronization clock performance.

Another aspect of the invention is directed to providing a system for monitoring timing-over-packet synchronization performance in a packet switching network comprising a plurality of network nodes. The system comprises a network management entity configured to: collect a physical topology of the packet switching network; determine a timing-over-packet synchronization topology of the packet switching network; retrieve synchronization clock source information from the network nodes; verify clock quality of synchronization clock sources identified in the receiving step; and monitor synchronization clock performance of the synchronization clock sources.

In some embodiments of the invention, the network management entity is configured to determine the timing-over-packet synchronization topology by collecting virtual path information of timing-over-packet connections.

In some embodiments of the invention, the network management entity is further configured to modify the synchronization topology of the packet switching network, responsive to the monitoring.

In some embodiments of the invention, the network management entity is further configured to set predetermined performance thresholds for the monitoring.

In some embodiments of the invention, the network management entity is further configured to: monitor network activity; and correlate the network activity with the synchronization clock performance.

Yet another aspect of the invention is directed to providing a program storage device readable by a machine, tangibly embodying a program of instructions executable by the machine to perform method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
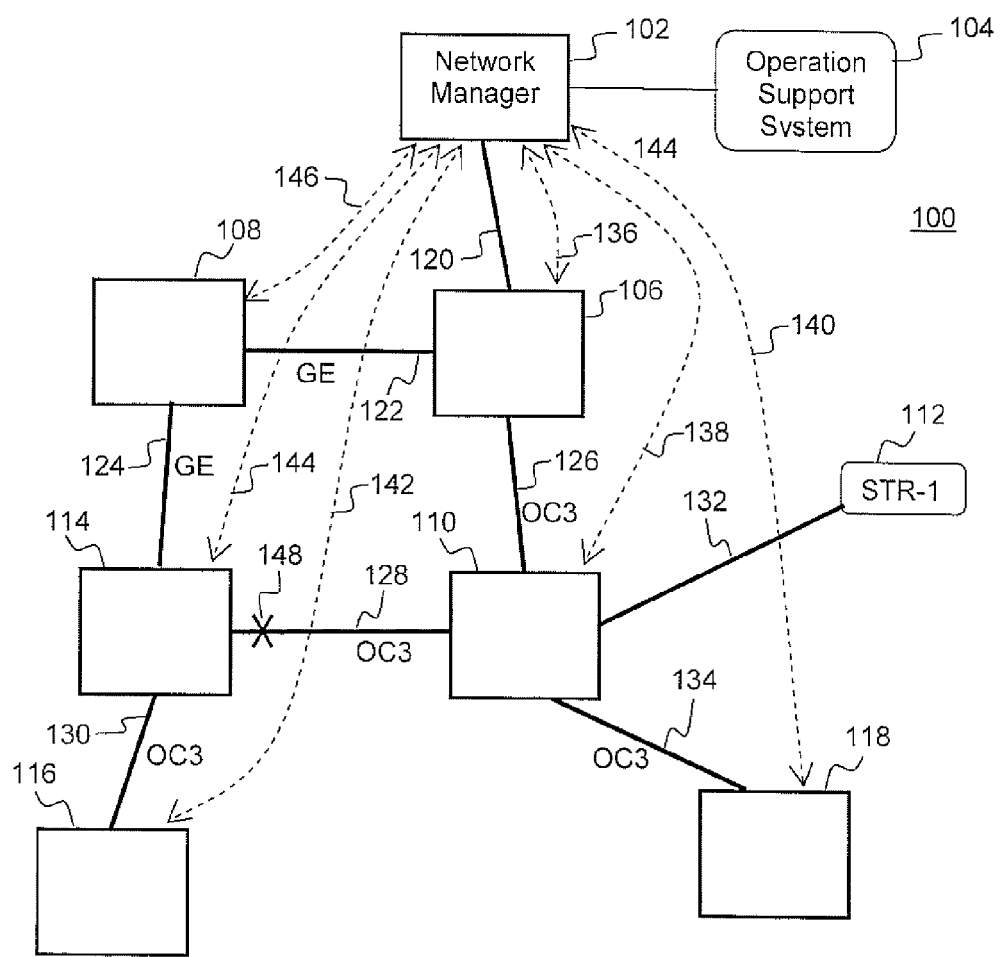
FIG. 1 illustrates a packet switching network configuration for monitoring timing-over-packet synchronization performance.

Referring to FIG. 1, communications network configuration 100 has network nodes 106, 108, 110, 114, 116, 118 interconnected via communications links 122, 124, 126, 128, 130, 134. Network nodes can include switches, routers, SONET/SDH Multiplexers (Muxs), and timing sources (e.g.: SSU/BITS/GPS/1588 Grand Master (GM) clocks).

Node 112 provides a high quality stratum 1 clock which can act as a timing source for the network via communications link 132 to node 110. Other types of high quality clocks include Global Positioning Satellite (GPS) clocks or atomic clocks. The exemplary network 100 has a combination of OC3 synchronous communication links 126, 128, 130, 134 and timing-over-packet Gigabit Ethernet links 122, 124 to illustrate that many communications networks need to be able to handle both synchronous layer 1 links and packet switched links which require timing-over-packet techniques, as will be understood by persons skilled in the art. Synchronous communications links transmit clock information via line timing and can include OC3/STM1, T1, E1/SDH or synchronous Ethernet. Timing-over-packet technologies include IEEE 1588v2, Adaptive Clock Recovery (ACR), and IETF Network Time Protocol (NTP).

Network Manager 102 provides Operations, Administration, Maintenance (OAM) support and control of the network nodes using Operation Support System (OSS) application software 104 and communicates to nodes in network 100 via communications link 120 to node 106. The OSS application software 104 and network manager 102 can be referred to collectively as a network management entity.

Figure 2:
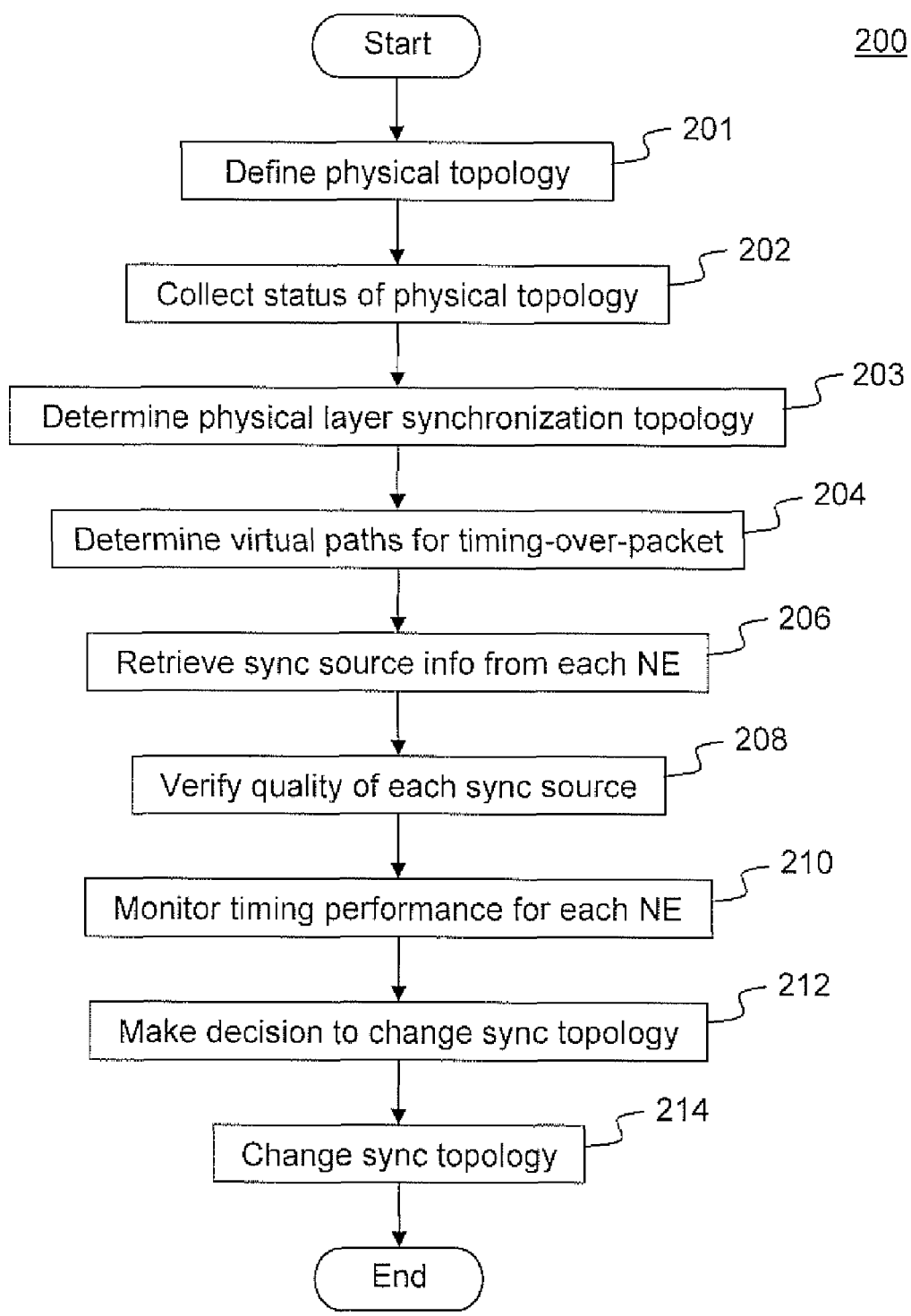
FIG. 2 illustrates a method monitoring timing-over-packet synchronization performance according to the embodiment depicted in FIG. 1.

The operation of the present invention will now be described with reference to the network diagram of FIG. 1 and steps 202-214 of the flowchart 200 of FIG. 2. At step 202, the OSS application software 104 on network manager 102 retrieves configuration, connection and status information from network nodes 106, 108, 110, 112, 114, 116, 118 via Command Line Interface (CLI) or Simple Network Management Protocol (SNMP) or Transaction Language 1 (TL1) messaging. Retrieved information could include interface status, central clock active reference, selected reference quality level derived from SSM, and path status for timing over packet endpoints. This messaging to and from the network manager 102 is illustrated by stippled lines 136, 138, 140, 142, 144, 146. More specifically, the OSS application software 104 on network manager 102 retrieves information from a table within the network manager, associating physical interfaces between network nodes to define links between those nodes. The Network Manager then retrieves from the network nodes 106, 108, 110, 114, 116, 118, the status of the physical interfaces on each of the network nodes; and then compiles the collected configuration data to build a model of the physical topology of the network. Once this link topology is created, it can then be used determine a Layer 1 synchronization overlay topology.

At step 204, the OSS application software 104 on network manager 102 then polls the network nodes 106, 108, 110, 114, 116, 118 for the virtual paths for timing-over-packet connectivity. At step 206, the OSS application software 104 on network manager 102 then polls the network nodes 106, 108, 110, 114, 116, 118 for the clock source for each network node and then compiles the collected configuration data to build a model of the synchronization topology of the network. At step 208, the OSS application software 104 on network manager 102 then verifies the quality of the clock source by polling the network node of each clock source. At this point a network node may have obtained its source quality info from the SSM or it may not. The Network Manager 102 can trace-back from a single node through its synchronization tree. For example, node 116 gets its sync from node 130 which is connected to node 114, which is getting its sync from node 128 which is connected to node 110, which is getting its sync from node 132 which is connected to node 112 which is a PRS clock source. to determine the clocking source quality of node 116. The Network Manager 102 can then compare what node 116 believes is the quality as received via the SSM communications. A representative SSM message for polling nodes could be of the form:

GET{active clock reference interface, active clock quality}.

At step 210, the OSS application software 104 on network manager 102 then monitors the synchronization clock performance for each network node. At step 212, the OSS application software 104 makes decisions to change synchronization topology in response to synchronization clock performance for one or more network nodes falling below a preset threshold and sends commands at step 214, to the network nodes to reconfigure the routing of clock synchronization information. The performance information from the central clock or its active reference can be monitored for stability, which is especially useful for timing-over-packet flows, but also applicable to layer 1 (L1) synchronization. Using metrics, for example the frequency offset values of the local Digital Phase-Locked Loop (DPLL) clock; the variation can be monitored against these thresholds to indicate that the source is too variable and should not be used. If ToP performance is failing the threshold, than the NMS can determine if there is a better route through the network for this flow to, for example, take fewer physical links between the source and destination or take links with less traffic load. The present invention can thus not only handle link failures, but also gradual degradation in synchronization performance. Responses can include adjusting the clocks for the network node having synchronization problems, raising an alarm or determining a better clock source for that node and issuing commands to the affected nodes to reconfigure the timing synchronization topology by issuing Synchronization Status Messaging (SSM)-like synchronization commands to the nodes. Configurable alarming can be configured based on failure (clock holdover/free-run), clock stability over thresholds (failure range or danger range), etc.

In one embodiment, the OSS application software 104 on network manager 102 can monitor other network activity and correlate the network activity, such as periods of traffic congestion or network rerouting events or physical link failures, with synchronization performance. If there are no specific correlating events, the present invention can also determine if there is a problem with a local oscillator.

Thus the present invention provides a means of monitoring timing-over-packet performance at the network level, thus contributing to a more robust telecommunications network. Other features can include displaying current network timing topology, timing performance such as clock stability statistics and alarms, either in tabular or graphical formats on a visual display via a network manager. In this manner, operators and technicians at a service provider premises can quickly understand important performance parameters of the network.

Typically, synchronous links such as OC3 are preferable to packet links such as timing-over-packet data links 122, 124 for conveying clock synchronization (sync) information, due to higher accuracy. In the example of network 100 of FIG. 1, node 112, provides a high quality clock to node 110 via OC3 link 132. Node 118 can get sync clock from node 110 via OC3 link 134; Node 106 can get sync clock from node 110 via OC3 link 126; Node 114 can get sync clock from node 110 via OC3 link 128; Node 116 can get synch clock from node 114 via link 130.

Node 108 can get sync clock from node 106 via GE link 122, or from node 114 via GE link 124. The OSS application software 104 on network manager 102 can monitor the sync clock performance for network nodes 106 and 114 and determine which would provide a better sync clock source to node 108, and then send commands to nodes 108, 106 and 114 to initiate the appropriate connections.

In the event of a link failure such illustrated at 148 of 003 link 128, node 114 can longer receive sync clock information from node 110. If node 108 was receiving sync clock information from node 114, this will no longer be available. In this case, the OSS application software 104 on network manager 102 monitors the sync clock performance for network nodes 106, 108, 110, 114, 116, 118 to determine that node 108 should get sync clock from node 106; node 114 should get sync clock from node 108; and node 116 should get continue to get sync clock from node 114, although the sync clock is now less accurate, being conveyed via GE links 124 and 122 instead of via OC3 link 128.

A person of skill in the art would readily recognize that steps of various above-described methods-can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of monitoring timing-over-packet synchronization performance in a packet switching network comprising a plurality of network nodes, the method comprising:
    defining, at a network management entity, a physical topology of said packet switching network;
    collecting, at the network management entity, a status of said physical topology;
    determining, at said network management entity, a physical layer synchronization topology of said packet switching network;
    determining, at said network management entity, a timing-over-packet synchronization topology of said packet switching network;
    retrieving, at said network management entity, synchronization clock source information from said plurality of network nodes;
    verifying clock quality of synchronization clock sources identified in said receiving step;

monitoring, at said network management entity, synchronization clock performance of said synchronization clock sources; and changing the determined timing-over-packet synchronization topology when the monitored performance falls below a preset threshold.

2. The method of claim 1, further comprising:
determining said timing-over-packet synchronization topology by collecting virtual path information of timing-over-packet connections.

3. The method of claim 2, further comprising:
modifying the physical layer synchronization topology of said packet switching network responsive to said monitoring step.

4. The method of claim 3, wherein said monitoring step further comprises:
setting predetermined performance thresholds.

5. The method of claim 4, wherein said monitoring step further comprises:
monitoring network activity; and
correlating said monitored network activity with said synchronization clock performance.

6. The method of claim 1, further comprising:
reconfiguring routing of the synchronization clock source information.

7. The method of claim 1, further comprising:
monitoring performance information from a central clock.

8. The method of claim 1, further comprising:
when the monitored performance falls below the preset threshold, determining an alternative path through the packet switching network.

9. The method of claim 1, further comprising:
monitoring gradual degradation in synchronization performance.

10. The method of claim 1, further comprising:
determining whether a local oscillator has a problem.

11. The method of claim 1, further comprising:
displaying current network timing topology.

12. The method of claim 1, further comprising:
displaying clock stability statistics and alarms.

13. The method of claim 12, wherein the displaying step uses a tabular format.

14. The method of claim 12, wherein the displaying step uses a graphical format.

15. A system for monitoring timing-over-packet synchronization performance in a packet switching network comprising a plurality of network nodes, the system comprising:
a network management entity configured to collect a physical topology of said packet switching network, determine a timing-over-packet synchronization topology of said packet switching network, retrieve synchronization clock source information from said plurality of network nodes, verify clock quality of the retrieved synchronization clock sources, monitor synchronization clock performance of said retrieved synchronization clock sources, and change the determined synchronization topology when the monitored performance falls below a preset threshold.

16. The system of claim 15, wherein the network management entity is configured to determine said timing-over-packet synchronization topology by collecting virtual path information of timing-over-packet connections.

17. The system of claim 16, wherein the network management entity is further configured to modify said physical topology of said packet switching network responsive to said monitoring.

18. The system of claim 17, wherein the network management entity is further configured to set predetermined performance thresholds.

19. The system of claim 18, wherein the network management entity is further configured to monitor network activity and correlate said monitored network activity with said synchronization clock performance.

20. A non-transitory program storage device readable by a machine, tangibly embodying a program of instructions executable by the machine to perform the method of claim 1.

* * * * *